Aug. 10, 1926.　　　　　　　　　　　　　　　　1,595,671
F. L. LIPCOT
CUSHION CONNECTION FOR CANTILEVER SPRING SUSPENSIONS
Filed Nov. 13, 1923　　　2 Sheets-Sheet 1
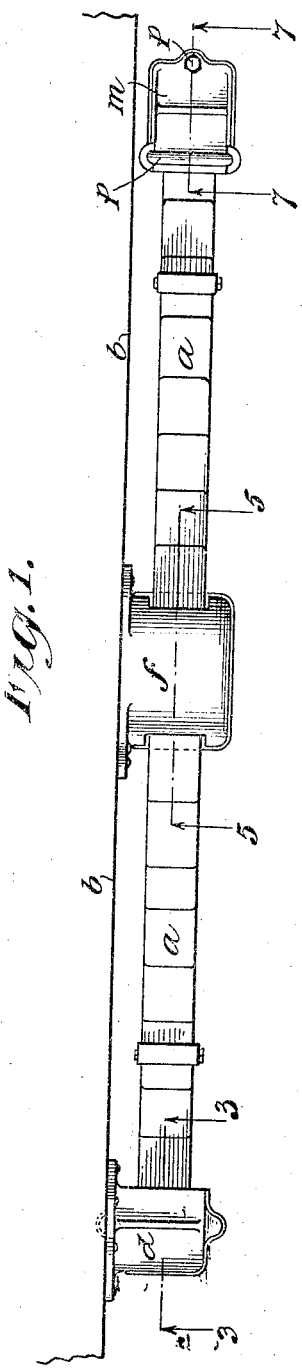
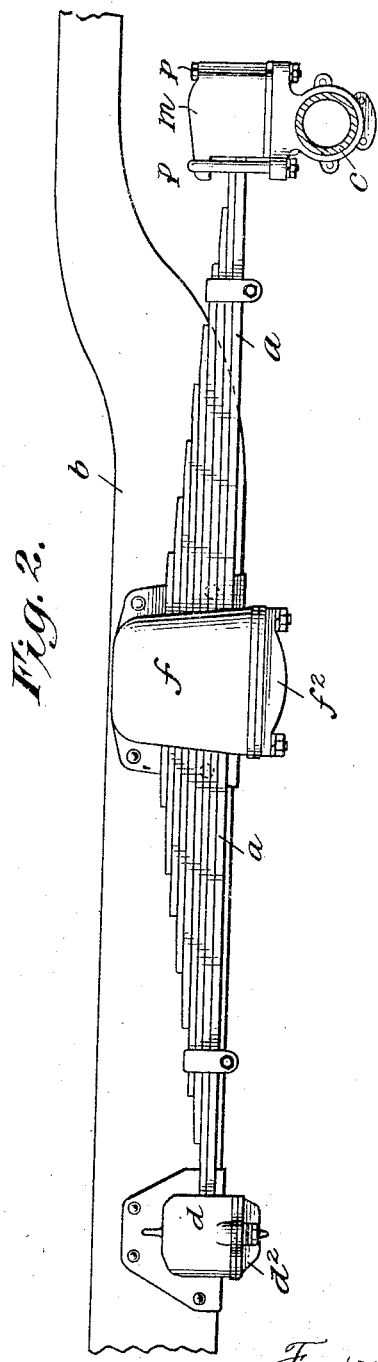
INVENTOR
Fred L. Lipcot
BY
Redding, Greeley, O'Shea & Campbell
ATTORNEYS

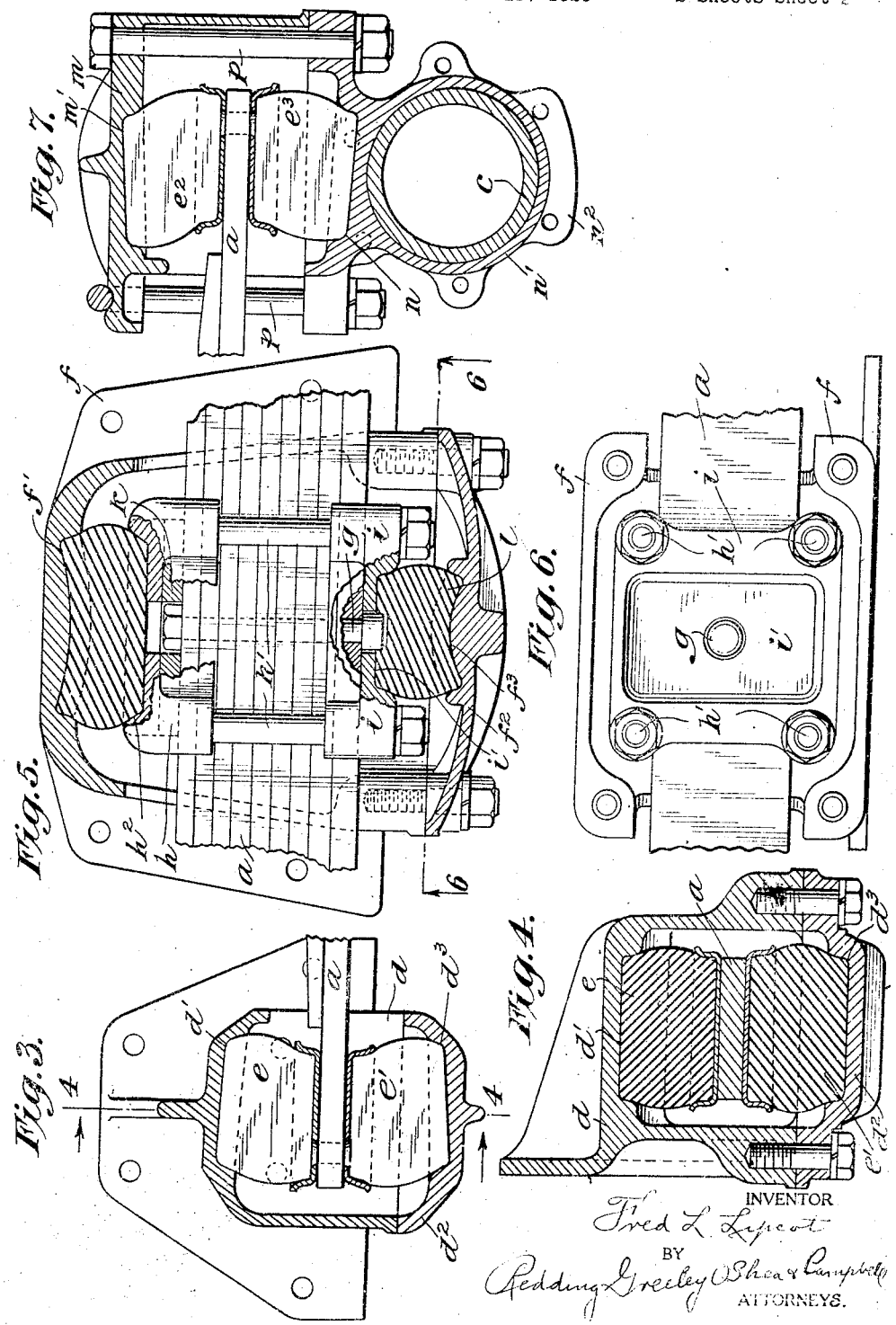

Patented Aug. 10, 1926.

1,595,671

UNITED STATES PATENT OFFICE.

FRED L. LIPCOT, OF NEW YORK, N. Y., ASSIGNOR TO THE RUBBER SHOCK INSULATOR COMPANY, INC., OF NEW YORK, N. Y., A CORPORATION OF DELAWARE.

CUSHION CONNECTION FOR CANTILEVER SPRING SUSPENSIONS.

Application filed November 13, 1923. Serial No. 674,463.

This invention relates to wholly non-metallic connections and supports interposed operatively between the cantilever spring of a motor vehicle and the axle and chassis frame therefor. It has for its principal object to provide such non-metallic connections and supports between one end of a vehicle spring of suitable type and the axle, between the other end of the spring and the chassis frame, and, at an intermediate of the spring, a similar connection between it and the chassis frame therefor affording a conventional cantilever suspension. A further object of the invention is to provide non-metallic connections and supports at the points referred to which shall be of such character as to afford the greatest possible degree of flexibility especially as regards canting of the spring without, however, making the construction less rugged or effective for its intended purpose. Still another object of the invention is to associate resilient non-metallic connections with the vehicle spring and with the brake for the vehicle as to permit such resilient connections to supplement the spring in its action of resisting yieldingly the braking stresses. In accordance with the invention it is proposed, in the preferred form, to extend one end of the vehicle spring into a housing carried by the frame and engage this end of the spring with resilient non-metallic material, such as rubber, which is held within the housing against displacement with respect thereto; to extend the spring adjacent its mid-section through another housing which is also carried on the frame and connect it with the frame at this point trough blocks of non-metallic yielding material such as rubber held within the housing and engaging the upper and lower sides of the spring; and, further, to connect the other end of the spring similarly to the axle through a suitable housing carried thereon which housing, may, in addition, support certain parts of the brake fittings so as to subject the vehicle spring and its yielding connections to the braking reactions. The invention will be described in greater particularity with reference to the embodiments shown in the accompanying drawings, wherein:

Figure 1 is a view in plan of a vehicle spring showing the improved connections associated therewith and with the frame of a chassis to effect a cantilever suspension.

Figure 2 is a view in side elevation of the parts shown in Figure 1, the axle being indicated in section.

Figures 3, 5, and 7, show in verticle section, respectively, the connection at the front end of the spring, the connection at its mid-section, and the connection at the rear end of the spring.

Figure 4 is a view in transverse section of the connection shown in Figure 3 taken on the plane indicated by the line 4—4 of Figure 3 and looking in the direction of the arrows.

Figure 6 is a view showing the underside of the spring and saddle as illustrated in Figure 5 and taken on the plane indicated by the line 6—6 of Figure 1, the lower resilient block being omitted.

As the description proceeds it will be evident that the improved connections may be associated with the leaf springs of any type for the purpose of providing a cantilever suspension for a vehicle body. As illustrated in Figures 1 and 2 such a leaf spring $a$ is shown as provided to support the vehicle frame $b$ from an axle $c$. It is proposed in accordance with the invention to connect the spring with the respective parts without using any metal to metal contact while actually increasing the resiliency of the suspension by the employment of yielding material at the points of connection. To this end, the forward end of the spring $a$ is shown as extending through an open side wall in a metal housing $d$ which is secured to the frame $b$ and is formed interiorly with a seat $d'$ to receive a block $e$ of non-metallic yielding material, preferably rubber, which also seats on the end of the spring $a$. The housing $d$ may be closed by a removable cap $d^2$ which is also provided with a seat $d^3$ to retain another block $e'$ of similar material which is also engaged with the end of the spring. It is preferred to incline the seats $d'$, $d^3$ so that they converge towards the other end of the spring $a$ thereby placing the yielding material $e$, $e'$ under greater compression at the inner side than at the outer side. A resolution of the internal stresses thereby set up within the material indicates that the spring $a$ is under a constant drag tending to prevent its withdrawal from the housing $d$. As shown in Figure 5 the spring $a$ is extended through the slotted walls of a housing $f$ which is also secured to the frame $b$. At its mid-section the spring may have its leaves united, as usual, by a through bolt $g$ and further secured by a spring clip $h$ having bolts $h'$ embracing the leaves at opposite sides and passing through a saddle $i$ for a purpose which is common. There is shown a plate $k$ between the clip $h$ and the top of the spring, this plate constituting in effect a shim whereby the parts may be assembled readily in desired relation and standardization permitted, as will later appear. The housing $f$ has provided therein a seat $f'$ for a block of yielding non-metallic material $k'$ which is also seated in a suitable recess $h^2$, provided therefor in the top surface of the clip $h$. The lower part of the housing is closed by a detachable cap $f^2$ which is provided with a seat $f^3$ for another block $l$ which is also seated in a recess $i'$ provided therefor in the under-surface of the saddle $i$. The construction described provides for a wholly non-metallic connection and support between the mid-section of the spring and the vehicle frame, the material employed being so engaged with the respective parts as to be held positively against displacement with respect thereto. A degree of flexibility between the parts is afforded by the yielding material and it is proposed in accordance with the improvements to increase this degree of flexibility by mechanical means found in spherical contours of the seats $f'$, $f^3$ for the respective blocks. By means of this spherical contour movement about the center line of the respective blocks in all planes is facilitated. Obviously, spherical surfaces may be provided elsewhere in the suspension for the same purpose.

As shown in Figure 7 the rear end of the spring extends into a housing $m$ through its front wall which is open and is engaged with non-metallic yielding material $e^2$, $e^3$, formed in sections in the illustrated case and seated, respectively, in a seat $m'$ formed in the housing $m$ and a seat $n$ formed in a supporting bracket $n'$ for the housing which in turn is carried on the axle $c$. Through bolts $p$ secure the housing to its support. The seats $m'$, $n$, converge towards the front end of the spring as described with respect to the seats $d'$, $d^3$, so that the blocks $e^2$, $e^3$, are placed under greater compression adjacent their forward edges thereby setting up internal stresses which tend to prevent the spring $a$ from withdrawing from the housing $m$. All of the material employed in connection with the parts described $e$, $e'$, $k'$, $l$ and $e^2$, $e^3$, is confined under compression for mechanical and physical reasons. The support $n'$ is mounted loosely or fixedly on the axle $c$ as may be dictated by the design of adjacent parts and may have flanges $n^2$ on which may be supported part of the braking mechanism for the vehicle (not illustrated) the relation of the braking mechanism to the support, $n'$, however, being such that the support is subject to the reaction of the braking stresses. This reaction, it should be observed, may be transferred to the spring $a$ which yieldingly resists it and is supplemented in resisting it by all of the yielding material which is associated with the spring. The ultimate reaction to the braking stresses is found largely in the frame but the conjoint action of the vehicle frame and the non-metallic yielding material associated therewith is such as to cushion the retarding movement of the car occasioned by braking stresses and largely absorb them.

The construction described affords a cantilever suspension of conventional type in so far as concerns the mechanical attributes while embodying therein many advantages incidental to the yielding and cushioning properties of the connections and supports.

Changes and rearrangements within the skill of a mechanic may be made without departing from the spirit of the invention so long as the desired results are secured by equivalent means.

What I claim is:

1. In combination with a vehicle frame, spring and axle, a housing into which the front end of the spring extends carried with the frame, blocks of non-metallic yielding material supported within said housing and engaged with the spring, a second housing secured to the frame adjacent the mid-section of the spring and through which the spring extends, blocks of non-metallic yielding material carried in said second named housing and engaged with the upper and lower sides of the spring, a third housing carried on the axle into which the rear end of the spring extends, and blocks of non-metallic yielding material carried with said housing and engaged with the rear end of the spring, seats in said end housings converging toward the center of the spring and carrying the respective blocks, and means associated with all of said housings to place said blocks under compression.

2. In combination with a spring, a housing into which the end of the spring extends, a wholly non-metallic connection and support interposed between the end of the spring and the housing and comprising non-metallic yielding material engaged with the end of the spring, and seats formed in the housing for the material to hold it against displacement with respect to the housing, said seats being formed in converging relationship to set up internal stresses within the material tending to draw the spring in the housing.

3. In a cantilever suspension for springs, a connection between the mid-section thereof and the frame of the vehicle including blocks of non-metallic yielding material engaged with the upper and lower sides of the spring and a housing through which the spring extends carried with the frame and having seats for said blocks, and means included within said connection for increasing the capacity for universal movement of the spring in the housing.

4. In a cantilever suspension for vehicles, a connection between the mid-section of the spring and the frame including blocks of non-metallic yielding material engaged with the upper and lower sides of the spring, a housing carried with the frame and through which the spring extends, spherical seats within the housing to receive the blocks and hold them against displacement with respect to the housing, and means to hold the blocks on the spring against displacement.

5. In a cantilever suspension for vehicles, a connection between the mid-section of the spring and the frame including blocks of non-metallic yielding material engaged with the upper and lower sides of the spring, a housing carried with the frame and through which the spring extends, spherical seats within the housing to receive the blocks and hold them against displacement with respect to the housing, a spring clip for the leaves of the spring anchored by a saddle and seats formed in the saddle and in the clip to engage the blocks and hold them against displacement with respect to the housing.

This specification signed this 10th day of November, A. D. 1923.

FRED L. LIPCOT.